(12) United States Patent
Wang

(10) Patent No.: US 11,524,587 B2
(45) Date of Patent: Dec. 13, 2022

(54) VEHICLE WITH LIFT GATE AND POWER UNIT THEREFOR

(71) Applicant: HYDRAULIQUE EAGLE INC./EAGLE HYDRAULIC INC., Mirabel (CA)

(72) Inventor: Feng Wang, Blanville (CA)

(73) Assignee: HYDRAULIQUE EAGLE INC., Mirabel (CA)

( * ) Notice: Subject to any disclaimer, the term of this patent is extended or adjusted under 35 U.S.C. 154(b) by 750 days.

(21) Appl. No.: 16/528,794

(22) Filed: Aug. 1, 2019

(65) Prior Publication Data

US 2019/0351852 A1 Nov. 21, 2019

Related U.S. Application Data

(63) Continuation of application No. 16/153,253, filed on Oct. 5, 2018, now Pat. No. 10,407,007.

(60) Provisional application No. 62/569,122, filed on Oct. 6, 2017.

(51) Int. Cl.
| | |
|---|---|
| *B60J 5/10* | (2006.01) |
| *B60L 50/40* | (2019.01) |
| *B60P 1/16* | (2006.01) |
| *B60P 1/44* | (2006.01) |
| *B60R 16/033* | (2006.01) |
| *B62D 63/08* | (2006.01) |
| *F15B 11/10* | (2006.01) |
| *B62D 33/027* | (2006.01) |

(52) U.S. Cl.
CPC ............. *B60L 50/40* (2019.02); *B60P 1/162* (2013.01); *B60P 1/4471* (2013.01); *B60R 16/033* (2013.01); *B62D 63/08* (2013.01); *F15B 11/10* (2013.01); *B60J 5/10* (2013.01); *B62D 33/027* (2013.01)

(58) Field of Classification Search
CPC ....................................................... B60L 50/40
USPC .................................................. 296/56, 106
See application file for complete search history.

(56) References Cited

U.S. PATENT DOCUMENTS

| | | | |
|---|---|---|---|
| 7,568,877 B1 | 8/2009 | Nespor | |
| 9,085,224 B2 * | 7/2015 | Chene | B60K 6/12 |
| 2008/0073132 A1 * | 3/2008 | Kaindl | B60L 3/04 320/167 |
| 2009/0288419 A1 * | 11/2009 | LaRose | B60P 1/4471 290/1 R |
| 2013/0213744 A1 | 8/2013 | Foley | |
| 2016/0365199 A1 * | 12/2016 | Tang | H01G 11/86 |

FOREIGN PATENT DOCUMENTS

| | | | | |
|---|---|---|---|---|
| DE | 102014006782 A1 | * | 12/2014 | B60L 1/00 |
| EP | 0460312 A1 | | 12/1991 | |
| WO | WO 2017/147556 | * | 8/2017 | |

* cited by examiner

*Primary Examiner* — Dennis H Pedder
(74) *Attorney, Agent, or Firm* — Alexandre Daoust; Norton Rose Fulbright LLP

(57) ABSTRACT

The vehicle can have an engine and a moveable lift gate, a power unit driving the movement of the lift gate, the power unit including an electric motor and a capacitor pack, the capacitor pack being connected for powering the electrical motor, and being connectable to a DC alternator source of the engine.

7 Claims, 9 Drawing Sheets

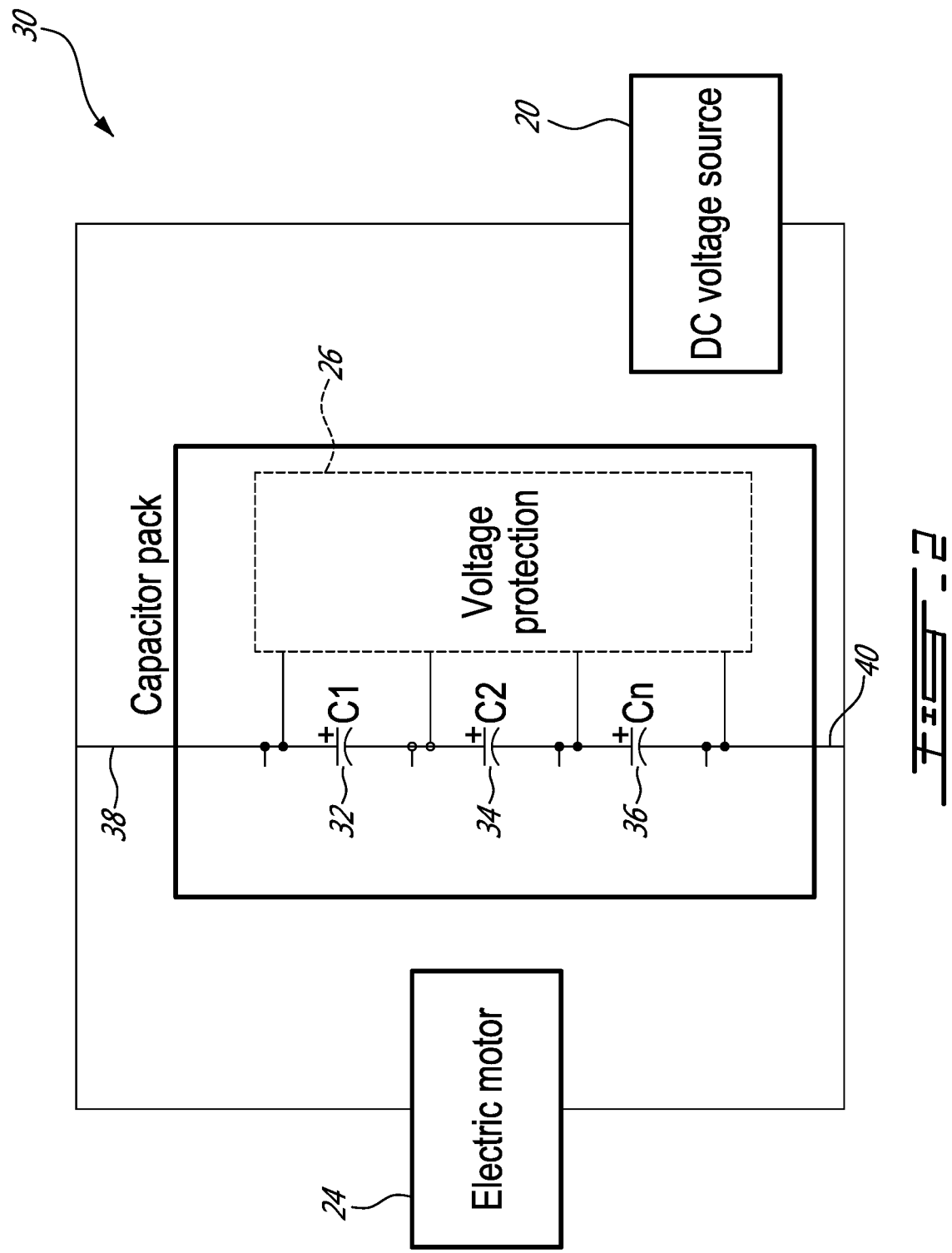

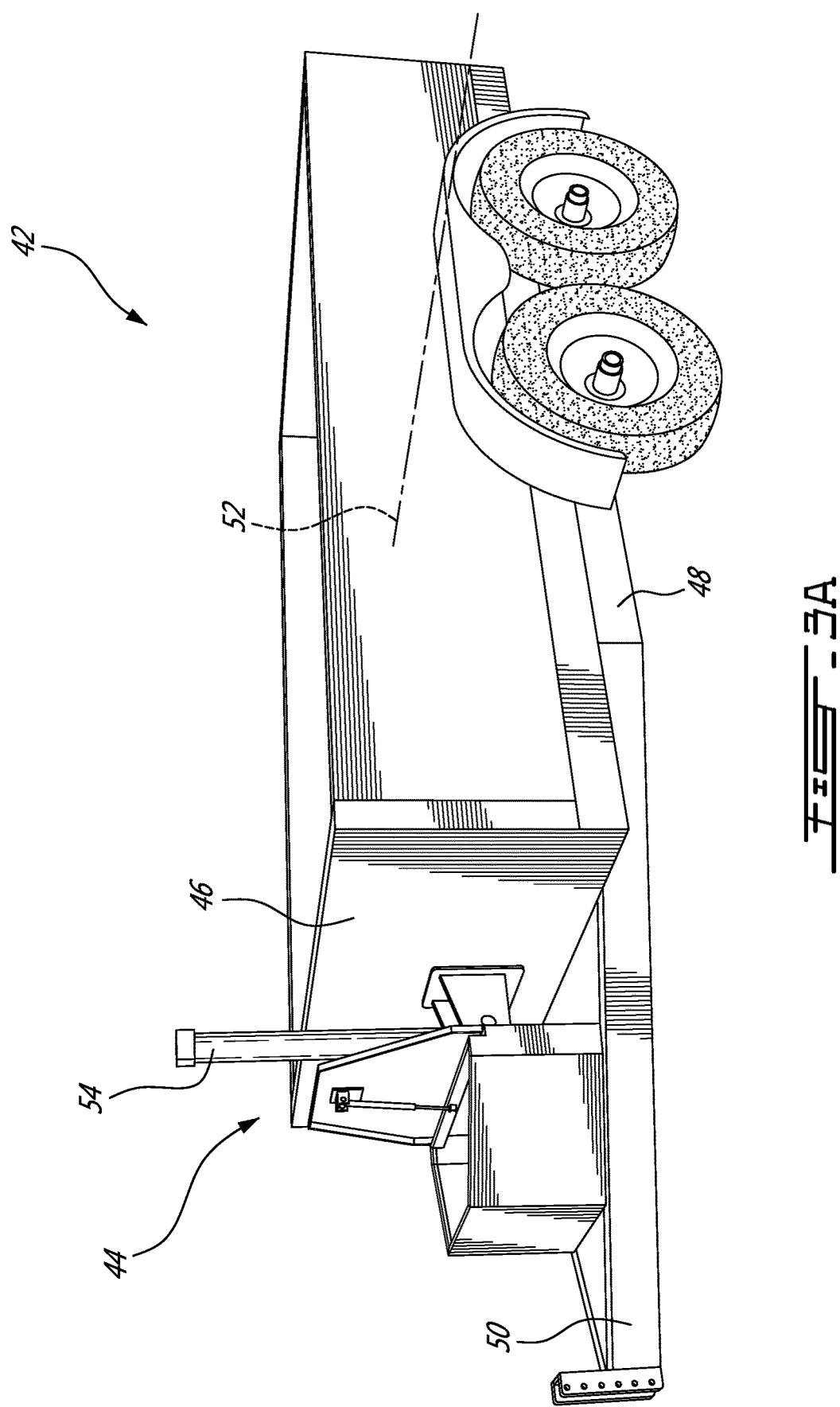

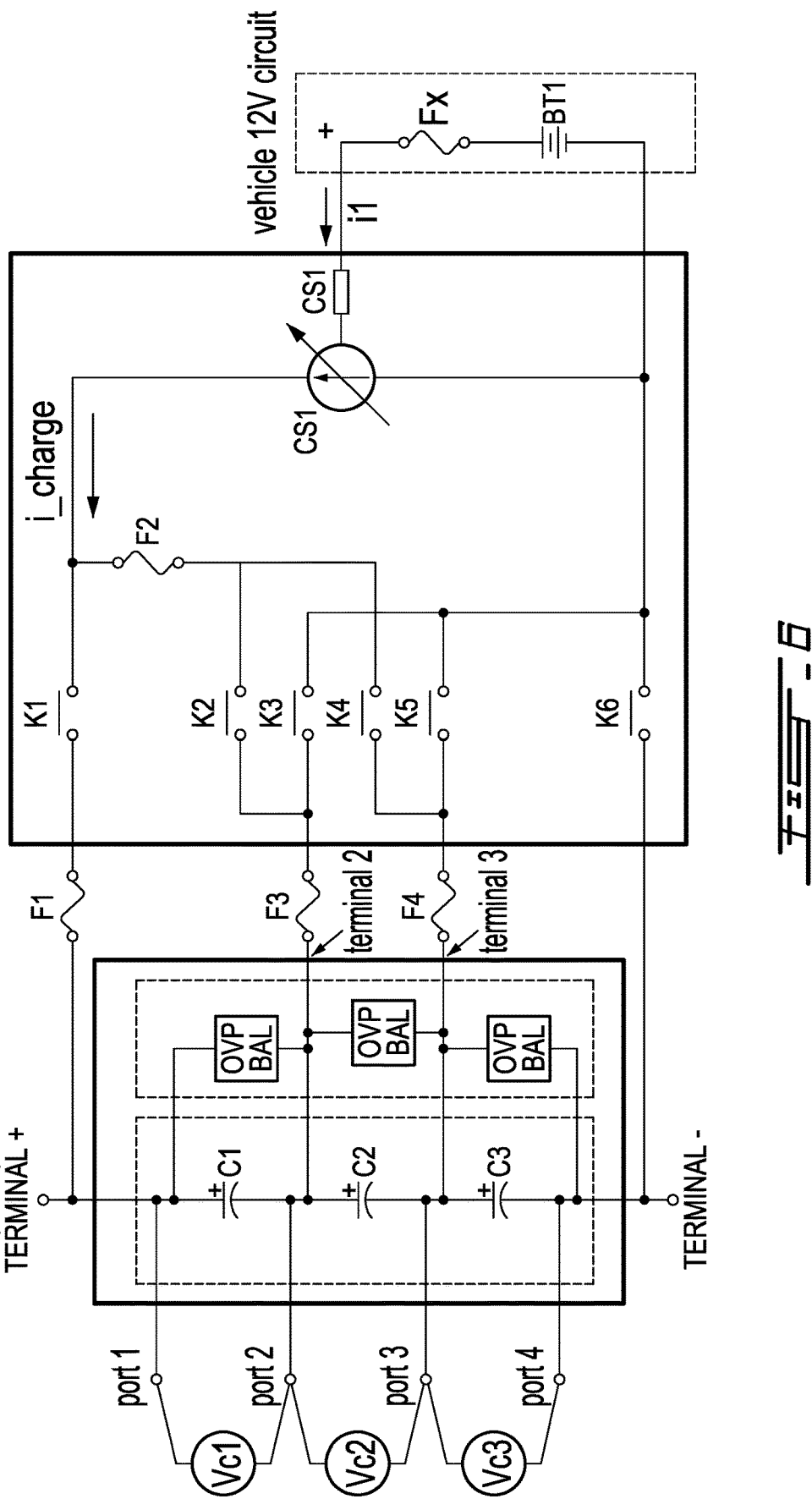

VEHICLE WITH LIFT GATE AND POWER UNIT THEREFOR

BACKGROUND

Electric or hydraulic actuators used on vehicles often require high power drive. Applications such as dump trailers, lift gates (on trailers or motorized vehicles), heavy load leveling systems and similar functions are frequently implemented on vehicles not equipped with high powered hydraulic or electric distribution systems. High power actuators for mobile systems typically require high intensity current pulses in the order of hundreds of amperes at low voltage such as ~12V or 24V, to be sustained for periods in the order of the minute. Such power and energy usually exceeds the capacity of the inherent electrical distribution system and require the use of an auxiliary battery. Battery technologies used in such applications include Lead-acid and Lithium-ion.

Lead-acid batteries are frequently used because of their low cost and availability but can be considered relatively heavy/bulky and require long charging times. They provide a limited number of cycles through their lifetime when used in harsh environment with frequent charge/discharge cycles at high amplitude current pulses. They require maintenance and regular replacement. When left discharged and exposed to cold temperatures, they can freeze and suffer permanent internal damage leading to battery failure.

Lithium-ion batteries, when properly sized, are capable of handling high intensity and long duration current pulses. However, they typically require sophisticated battery chargers for reliable and long term use. Moreover, during long term storage of the system, Lithium-ion batteries must be cycled and recharged periodically to avoid internal damage and suffer degradation causing loss of performance, making them unsuitable for certain applications.

Accordingly, while the prior technology was satisfactory to a certain degree, there always remains room for improvement.

SUMMARY

It was found that using a capacitor pack (such as a supercapacitor bank) instead of batteries could alleviate some of the inconveniences of prior technologies, and be particularly suitable for applications with power units provided on moveable auxiliary equipment such as dumping trailers and liftgates. For instance, the capacity of the capacitor pack can be sized as a function of the expected needs of the specific application. In a dumping trailer or liftgate application, for instance, the capacitor pack can be sized for one or two actuator cycles.

Indeed, capacitors commonly referred to as supercapacitors (also known as ultracapacitors and double-layer capacitors) have been developed over recent years, and provide a surprisingly high capacitance value compared to traditional capacitors. Various types of supercapacitors exist, such as double-layer capacitors, pseudocapacitors, and hybrid capacitors, at least some of which can provide a high number of cycles through their lifetime, in the order of one hundred thousand (~100000) cycles or more. They can also offer a low mass to power density ratio and can sustain high intensity discharge currents. Supercapacitor banks can require little to no maintenance. On the other hand, the behaviour of supercapacitors can be quite different from the behaviour of batteries during use, in particular, the voltage of supercapacitor banks can deplete as it is providing its energy to the load, by contrast to the voltage of batteries which typically remains more constant. It was found that using a supercapacitor bank is nonetheless be advantageous in the context of some moveable auxiliary equipment applications, such as dumping trailer and liftgates.

In accordance with one aspect, there is provided a trailer comprising a wheeled frame with a coupling at a front end thereof, a moveable component, a power unit driving the movement of the moveable component, the power unit including an electrical motor and a capacitor pack, the capacitor pack being connected for powering the electrical motor, and being connectable to a DC electrical source.

In accordance with a more general aspect, there is provided a vehicle comprising a wheeled frame, a moveable auxiliary equipment component, a power unit driving the movement of the moveable auxiliary equipment component, the power unit including an electrical motor and a capacitor pack, the capacitor pack being connected for powering the electrical motor, and being connectable to a DC electrical source.

It will be understood that the expression 'computer' as used herein is not to be interpreted in a limiting manner. It is rather used in a broad sense to generally refer to the combination of some form of one or more processing units and some form of memory system accessible by the processing unit(s). Similarly, the expression 'controller' as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 2 is a block diagram of the power unit of the system of FIG. 1;

FIG. 3A is an oblique view of an example of a dumping trailer having a power unit;

FIG. 6 is a block diagram of an example of a capacitor pack in combination with an on-board fast charger having an optional overvoltage protection and voltage balancing function;

DETAILED DESCRIPTION

Figure 1:
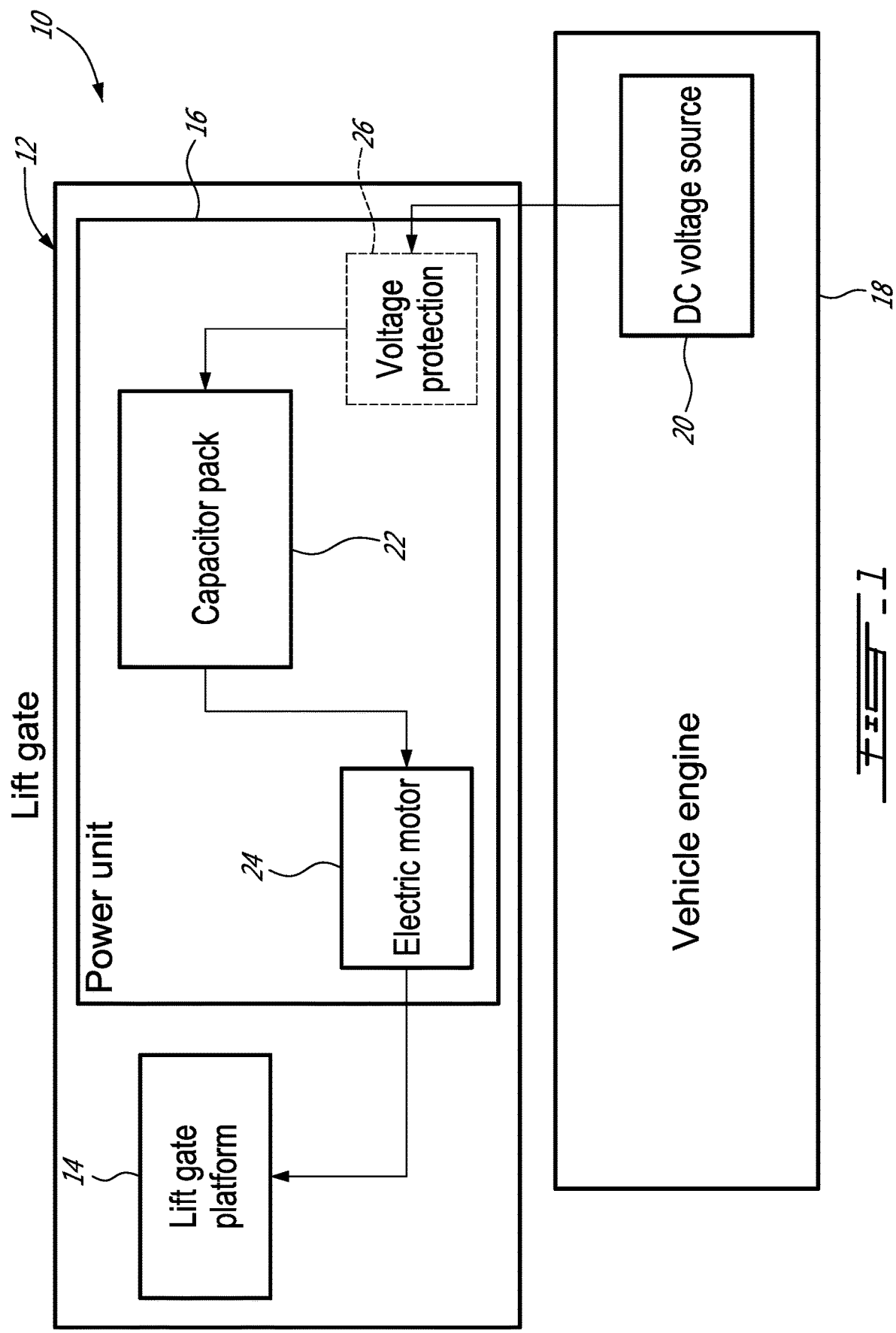
FIG. 1 is a block diagram of a lift gate having a power unit.

FIG. 1 schematically depicts the different components of an example vehicle 10, such as a delivery truck for instance, which includes a lift gate 12 with a lift gate platform 14, an electric power unit 16, and an engine 18 (e.g. Diesel or gasoline engine) which provides a DC voltage source 20 to the electric power unit 16. The electric power unit 16 includes a capacitor pack 22, more specifically a supercapacitor bank in this case, which is used to power an electric motor 24. The electric motor 24 is used to move the lift gate platform 14 of the lift gate 12, which can be performed via an additional actuator such as a hydraulic cylinder, for instance. In an alternative embodiment, which will be detailed further below the vehicle can be a trailer instead of a delivery truck and the moveable component can be a pivotable open box of the trailer instead of a lift gate, for instance. Alternate embodiments can have any other suitable auxiliary equipment/moveable component. The supercapacitor bank is adapted to receive power from a DC voltage source. The DC voltage source 20 can be a low voltage source (e.g. equal to or less than 24 volts DC), such as an engine alternator voltage source of a motorized vehicle, for instance. Vehicle alternator DC sources are often slightly above 12 V DC (e.g. around 14 or 15 V DC). Accordingly, a suitable voltage protection device 26, such as a transformer for instance, can be used to reduce the voltage to a voltage found suitable for the capacitor pack, if required in the context of the specific capacitor pack selected for a given application.

FIG. 2 provides more schematic detail about an example configuration for a supercapacitor bank 30. In this example, the supercapacitor bank 30 includes a plurality of supercapacitors elements 32, 34, 36 in series between two main terminals 38, 40. The DC voltage source 20 and the electric motor 24 can both be connected to the two main terminals 38, 36 of the supercapacitor bank. As shown in FIG. 2, a voltage protection circuit 26 can optionally be provided in relation with the supercapacitor elements. This embodiment has three supercapacitor elements 32, 34, 36, but it will be understood that the number of supercapacitor elements of a particular embodiment will be adapted as a function of the characteristics of the individual supercapacitor elements and of the requirements of the application, and therefore a different number of supercapacitor elements can be preferred in alternate embodiments.

Figure 3B:
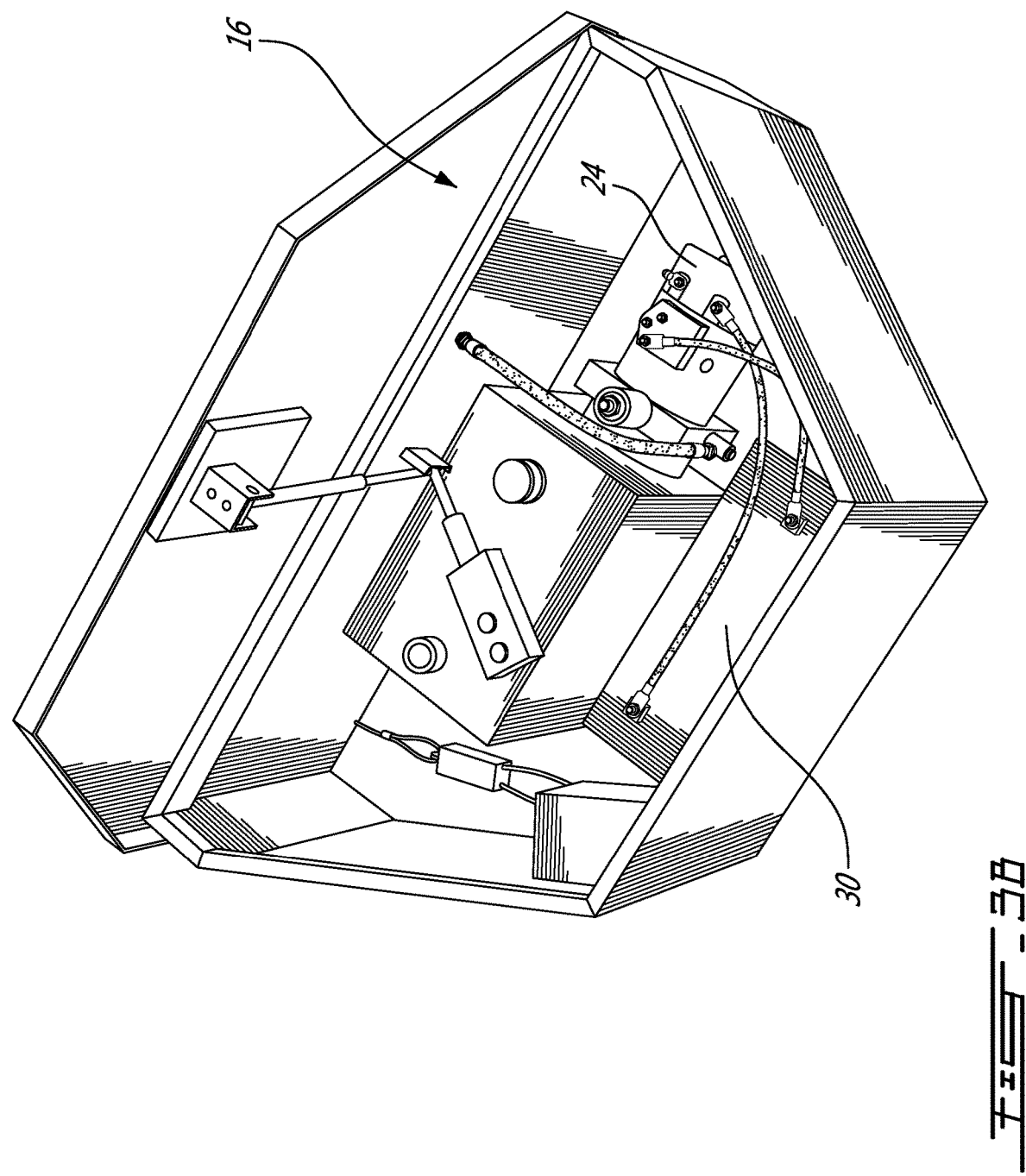
FIG. 3B is an oblique view of the power unit of the dumping trailer of FIG. 3A.

Turning now to FIGS. 3A and 3B, a second example is presented. In this example, two vehicles are involved: a towing vehicle having the engine (not shown), and a trailer vehicle 42 bearing the auxiliary equipment 44. The moveable component of the auxiliary equipment is a pivotable open box 46 in this example. The trailer 42 has a wheeled frame 48 with a coupling 50 at the front end. The nature of the coupling 50 can vary from one embodiment to another, and the coupling 50 can be a tow hitch or a fifth wheel coupling, to name two examples. The open box 46 is pivotally mounted around a transversal horizontal axis 52 for dumping as known in the art. An actuator, provided here in the form of a hydraulic cylinder 54, has a first end connected to the wheeled frame 48, and a second end connected to the open box 46. The actuator is operable to change the distance between the first end and the second end, thereby raising (for dumping) or lowering the front end of the open box.

FIG. 3B, presents the power unit 16 in greater detail. An electric motor 24 is provided to drive a hydraulic pump which feeds hydraulic pressure to the actuator. The supercapacitor bank 30 is positioned close to the electric motor 24, in a manner to limit the length of cable required to connect the supercapacitor bank to the electric motor. In this example, the length of the cables can be between 6 and 24 inches, preferably below 18 inches, for instance.

The DC voltage source 20 can be the vehicle's alternator, in which case a connector can be provided to connect an electrical wire/cable of the supercapacitor bank on the trailer 42 to an electrical wire/cable connected to the alternator in the vehicle. Such a connector can be the main power line for the trailer for instance, in which case the supercapacitor bank may be configured to share the towing vehicle alternator's power with other electrical devices of the trailer (e.g. lights).

Figure 4A:
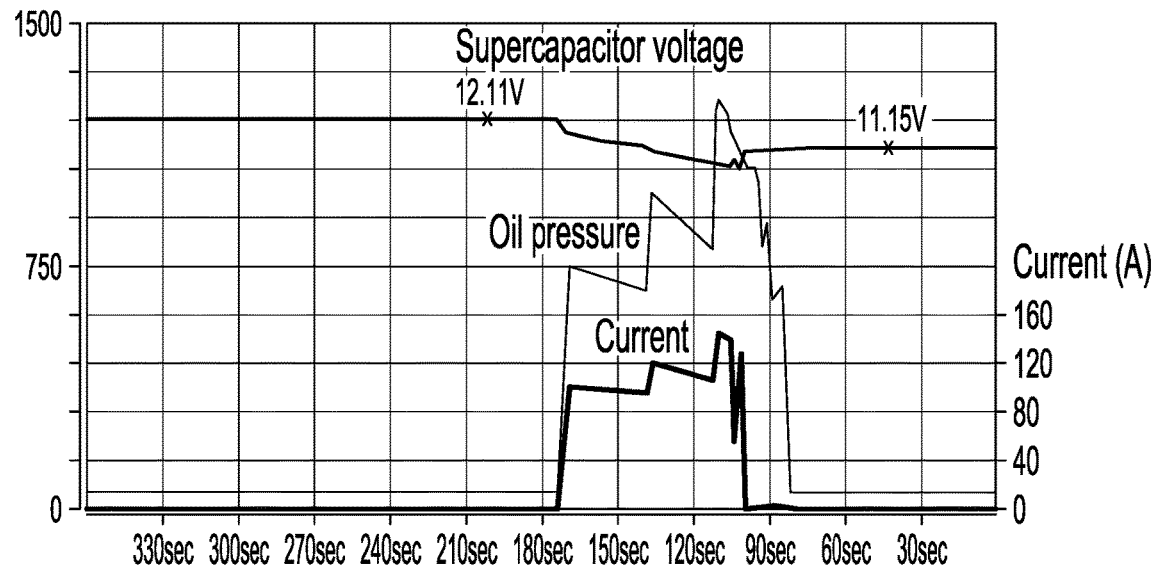
FIGS. 4A and 4B are graphs showing values varying during corresponding successive electric motor cycles.
Figure 4B:
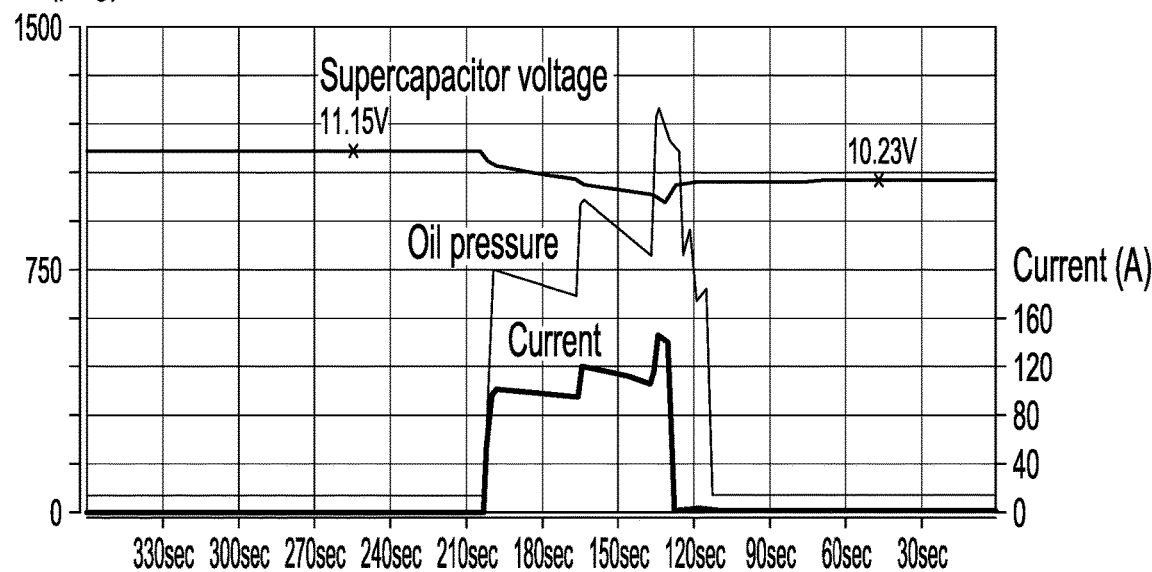

The example embodiment shown in FIGS. 3A and 3B were tested over various cycles. During testing over two successive cycles, the oil pressure, the current, and the voltage of the supercapacitor bank were measured and plotted against the graphs presented at FIGS. 4A and 4B. As shown, the results are positive. While the supercapacitor voltage lowered during the first activation (from 12 to 11 V), and lowered again during the second activation (from 11 to 10V), the operation of the electric motor which was driving the hydraulic pump was satisfactory over the two cycles.

Figure 5:
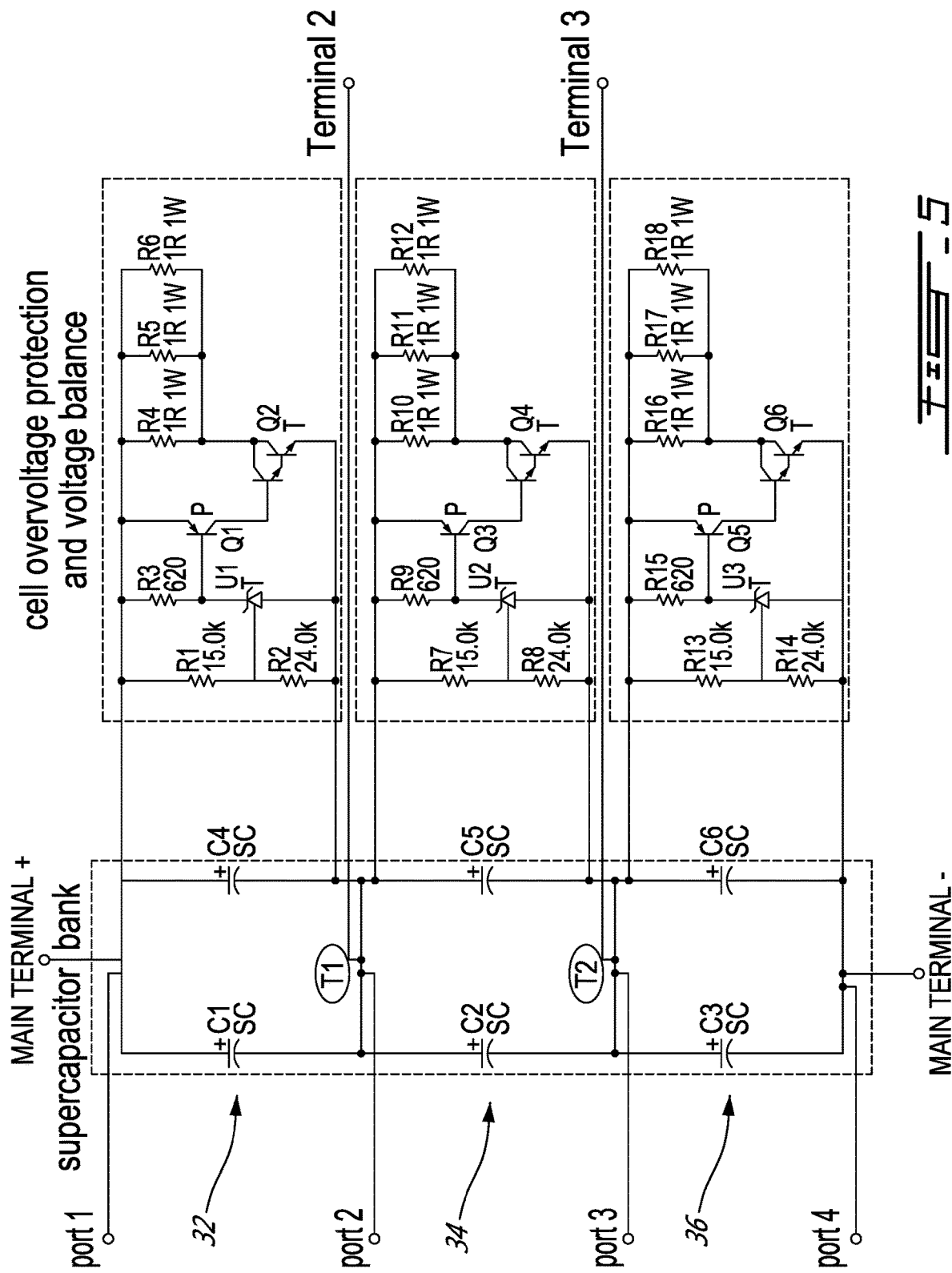
FIG. 5 is a block diagram of an example of a capacitor pack.

FIG. 5 shows an example of an alternate embodiment in which additional circuitry has been provided. More specifically, it can be seen that in this example, each one of the supercapacitor elements 32, 34, 36 includes two individual elements (e.g. C1, C4) in parallel. Additional terminals are provided between each supercapacitor element. Each individual supercapacitor element is provided with cell overvoltage protection and voltage balance circuitry. The individual elements can be Li-ion capacitors, for instance.

Figure 7A:
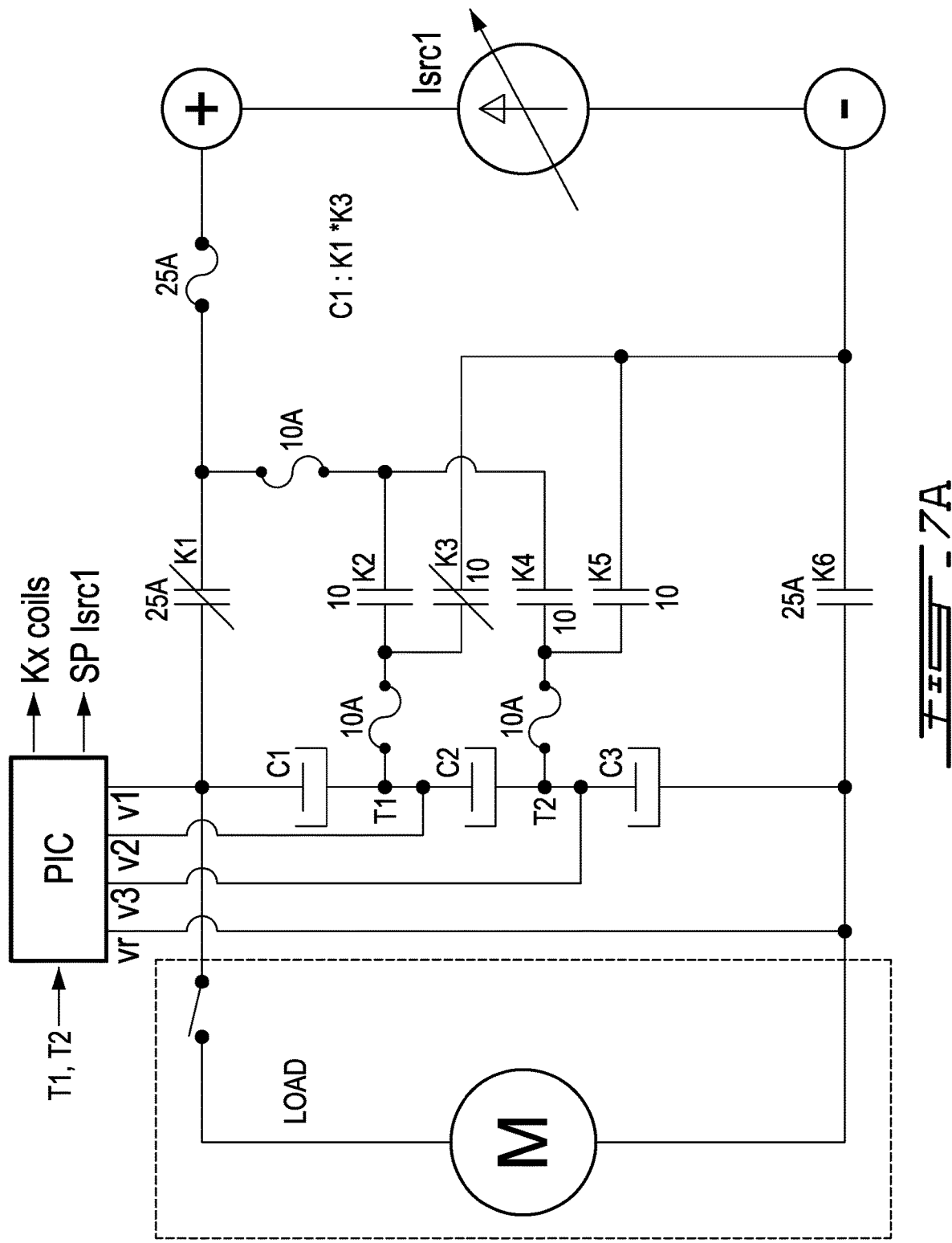
FIGS. 7A and 7B are schematic view showing respective example modes of operation of a capacitor pack and charger.
Figure 7B:
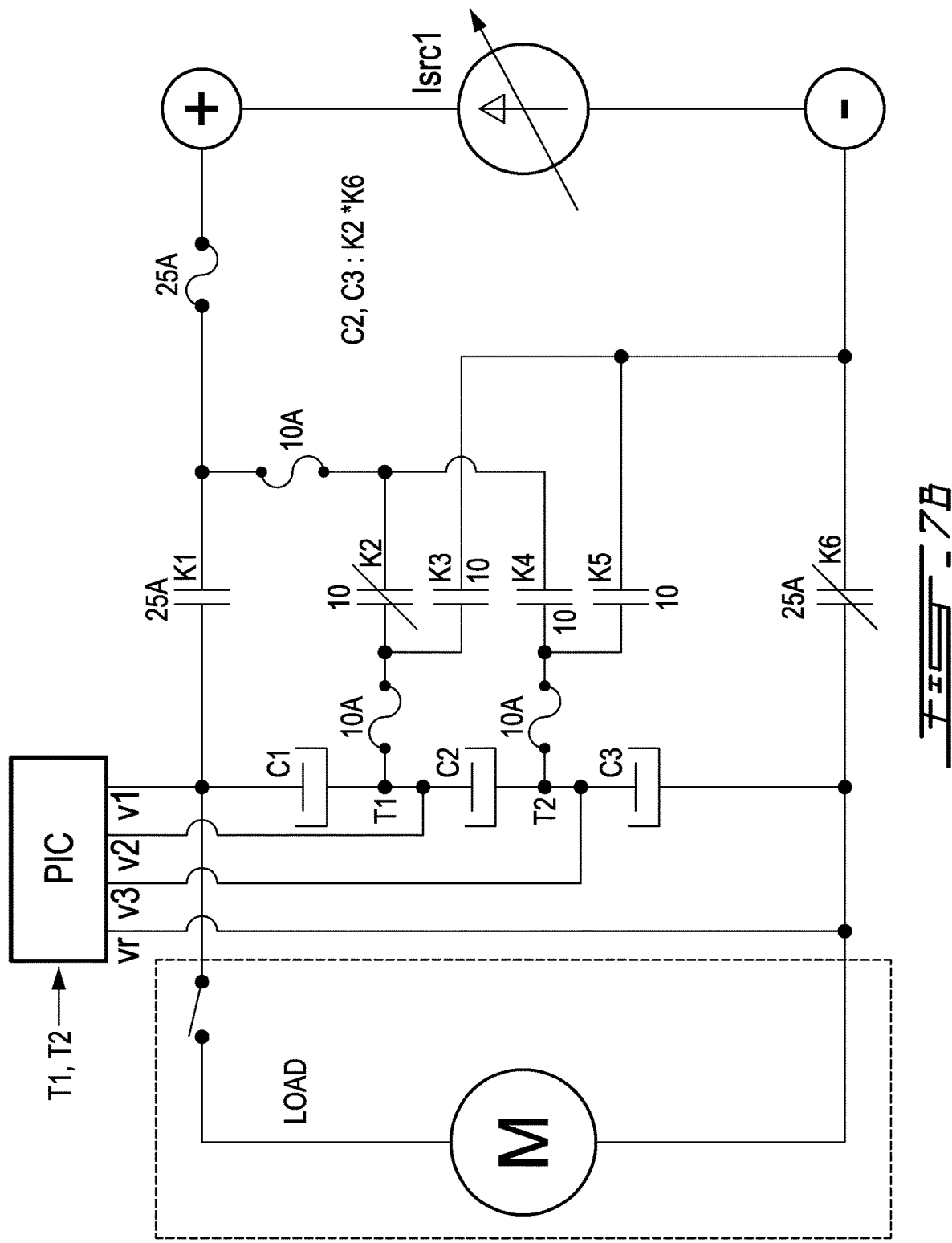

FIG. 6 presents other details of one possible embodiment. In particular, the additional terminals can be used to connect control lines (Vc1, Vc2, Vc3) which can measure the voltage of each individual supercapacitor element. This data can be provided to a computer, such as a programmable integrated circuit for instance, which can then be used to toggle DC contactors of a charging unit to balance the voltage between the individual supercapacitor elements in real time. Examples of this balancing operation is shown in FIGS. 7A and 7B. In FIG. 7A, the DC contactors K1 and K3 are activated to direct current from the DC source solely to supercapacitor element C1. This can correspond to a scenario where the voltage of supercapacitor element C1 is below the voltage of supercapacitors C2 and C3, for instance. In FIG. 7B, contactors K2 and K6 are activated to direct current from the DC source to both supercapacitor elements C2 and C3. This can correspond to a scenario where the voltage of supercapacitor element C1 is above the voltage of supercapacitors C2 and C3, for instance. When the supercapacitor elements are balanced, normal charging operation can occur by activating contacting elements K1 and K6, for instance. Such a voltage balancing circuit is optional. In some embodiments, disbalance between the voltage of capacitor elements can be considered entirely acceptable, or otherwise acceptable to the extent that the extra costs associated to balancing circuitry are not worth investing into. It will be understood that in this example, the supercapacitor bank has three supercapacitor elements, but that in alternate embodiments having less or more than three supercapacitor elements, the circuit can be adapted accordingly.

In an alternate embodiment, the actuator can be electrical instead of hydraulic, and can thus directly be the electric motor which is powered by the capacitor pack. This may require additional circuitry, however, as many electric cylinders require more precise voltage to be activated than rotary electric motors do.

As can be understood, the examples described above and illustrated are intended to be exemplary only. Indeed, supercapacitors can be used to drive the movement of a moveable component on an auxiliary equipment (e.g. a high power equipment such as an open box, other than the wheels) on a motorized vehicle (a vehicle having an engine driving the movement of its wheels). Indeed, many vehicles, motorized or not, have auxiliary equipment which are designed for intermittent use, and which can advantageously be powered by a capacitor pack rather than a battery. Delivery trucks are an example as many delivery trucks have lift gates which are raised and lowered at each delivery location. The charging of the capacitor pack by the alternator can be performed in a few minutes, which it typically less than the amount of time between delivery locations. The scope is indicated by the appended claims.

What is claimed is:

1. A vehicle having an engine and a moveable lift gate, a power unit driving the movement of the lift gate, the power unit including an electric motor and a capacitor pack, the capacitor pack being connected for powering the electrical motor, and being connectable to a DC alternator source of the engine, wherein the capacitor pack is a supercapacitor bank including a plurality of supercapacitor elements in series between two main terminals, further comprising an additional terminal provided between each supercapacitor element, and control lines connected via the additional terminals and configured to measure the voltage of each supercapacitor element; and a computer operable to balance the voltage of the supercapacitor elements in real time based on the measured voltage.

2. The vehicle of claim 1 wherein the capacitor pack is connected to the electrical motor via an electrical cable having between 6 and 24 inches in length.

3. The vehicle of claim 1 wherein the capacitor pack is a supercapacitor bank including a plurality of Li-ion supercapacitors.

4. The vehicle of claim 1 wherein each supercapacitor element includes two individual elements in parallel.

5. The vehicle of claim 1 wherein the capacitor pack has sufficient power to drive the movement of the lift gate twice.

6. The vehicle of claim 1 wherein the electric motor is a rotary electric motor.

7. The vehicle of claim 1 wherein the capacitor pack is configured to deplete as it drives the movement of the lift gate.

* * * * *